May 16, 1933.   J. R. KOVAR   1,908,903
SWEEP PLOW
Filed July 13, 1932
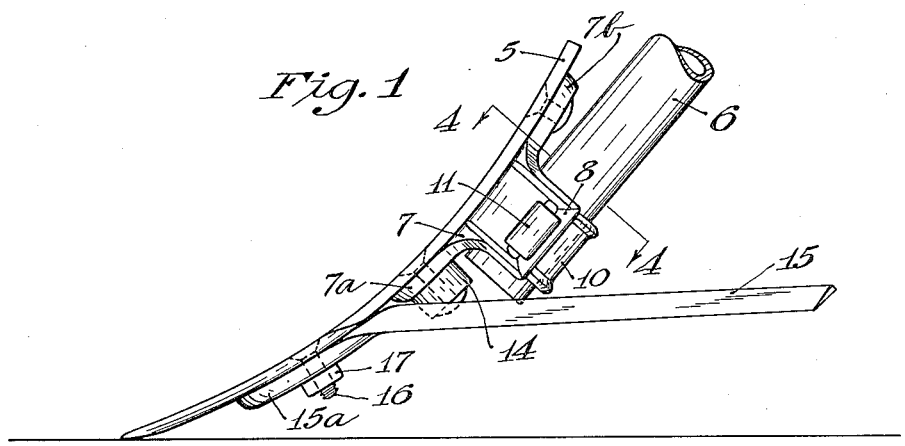
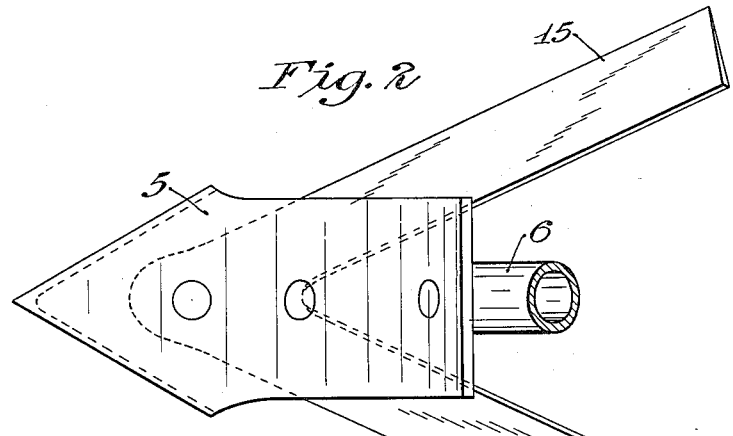
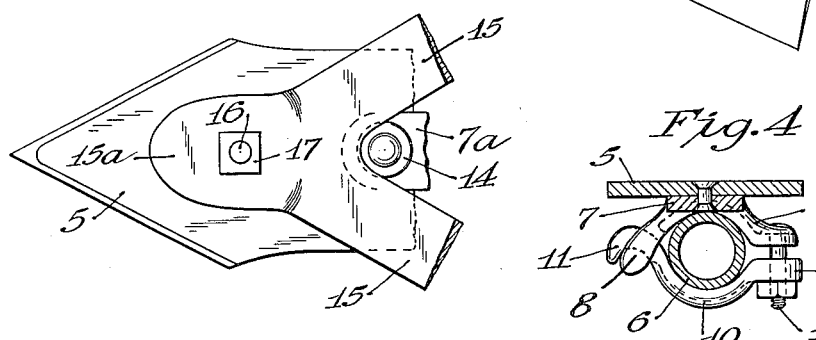
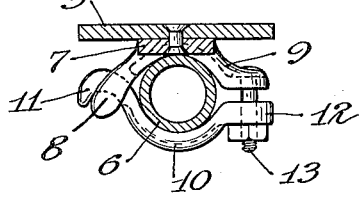
Inventor
John R. Kovar
By his Attorneys
Williamson & Williamson Patented May 16, 1933

1,908,903

UNITED STATES PATENT OFFICE

JOHN R. KOVAR, OF ANOKA, MINNESOTA

SWEEP PLOW

Application filed July 13, 1932. Serial No. 622,197.

My invention relates to agricultural implements and particularly to thistle sweep shovels or duck foot shovels.

The conventional forms of wing or sweep plows or shovels tend to clog when used in soft soil and are not designed to clear themselves of rubbish lying on the ground in which they are used. Many such plows now available are complicated and expensive of construction and are not adapted for rapid and convenient detachment of the wing blades.

It is an object of my invention to provide a sweep shovel of very simple and inexpensive construction having a main shovel or plow and a pair of rearwardly diverging wing blades attached to the shovel.

Another object is to provide a sweep shovel of the class described wherein the wing blades may be quickly and easily detached therefrom, as for sharpening, and may be quickly and easily attached or replaced.

Still another object is to provide a sweep shovel of the class described which will not clog when used in soft soil and which will effectively clear itself of surface rubbish.

A further object is to provide a sweep shovel of the class described wherein means is provided for rapid and convenient attachment thereof to a cultivator shank and which may be used to cut weeds and mulch the soil.

These and other objects and advantages of the invention will be more fully set forth in the following description made in connection with the accompanying drawing, in which like reference characters refer to similar parts throughout the several views, and in which: —

Fig. 1 is a side view of my sweep plow as it appears in normal operating position;

Fig. 2 is a top view;

Fig. 3 is a partially fragmentary bottom view, and

Fig. 4 is a section taken along the line 4—4 of Fig. 1 as indicated by the arrows.

Referring to the drawing, the main plow 5 of my sweep shovel is pointed at the forward end and the edges of the forward portion diverge rearwardly from the pointed end to respectively meet substantially parallel edges of the medial and rear portions. From the pointed forward end thereof the shovel is curved upwardly as shown in Fig. 1. The diverging edges of the forward portion are sharpened to form a cutting edge. The upper surface is smoothed and polished.

For attachment of the plow 5 to a shank 6 of a cultivator, a simple and efficient clamping device is secured to the lower and rearward side of the plow 5. The clamping device consists of a base 7, having a pair of feet 7a and 7b respectively projecting forwardly and rearwardly therefrom and riveted or otherwise secured to the plow 5, two curved portions 8 and 9 formed integrally with the base 7 and projecting rearwardly and downwardly therefrom, the inner surfaces of the portions 8 and 9 being shaped to cooperatively form a concave arcuate bearing surface therebetween, and a removable clamping member 10, having an arcuate concave inner surface. One end of the clamping member 10 carries a hook-shaped projection 11 adapted to engage an apertured part of the curved portion 8, as shown. The remaining end of the clamping member 10 is provided with a lug 12 having an aperture aligned with an aperture in the curved portion 9. A nutted bolt 13 projects through the above mentioned aligned apertures, as shown in Fig. 4, and, obviously, is adapted to draw the clamping member 10 toward the curved portions 8 and 9 to clamp the cultivator shank 6 therebetween as indicated in Fig. 4. The forwardly extending foot 7a of the base 7 is provided with a downwardly and rearwardly projecting boss 14, the purpose of which will be explained later.

An integral pair of rewardly diverging wing blades 15 extend substantially horizontally from the lower and rearward side of the plow 5. The forward end 15a of the integral pair of blades underlies the plow 5 and extends forwardly and downwardly along the lower sides of the plow 5 for the purpose of attachment thereto. A screw threaded stud 16 projecting from the lower side of the plow 5 extends through an aperture in the forward end 15a of the integral pair of blades. A nut 17 is provided for engagement with the stud 16 to clamp said end of the pair of blades against the plow. The crotch formed between the blades of the integral pair of wing blades 15 is shaped and positioned to engage the boss 14, previously described, to normally prevent swinging of the blades 15 about the stud 16 and thus maintain the blades in symmetrical relation with respect to the plow 5.

Operation

In operation my sweep shovel is attached to a shank 6 of a vehicle by means of the clamping device shown in Fig. 4. It is obvious that attachment or removal may be effected by loosening of the bolt 13 or, if desired, removal of the bolt 13 and the clamping member 10. When this has been done the sweep shovel may easily be placed in or removed from its normal position on the shank 6.

To remove the wing blades 15 from the plow it is only necessary to remove the nut 17 and pull the blades off of the stud 16.

In normal use of my sweep shovel, the same is positioned with the rear portion thereof tilted somewhat downward with respect to the position shown in Fig. 1 and is drawn through the soil with the pointed end of the plow 5 leading and the wing blades 15 disposed but a short distance below the surface of the soil. As the plow is drawn through the soil the pointed forward end of the same penetrates the soil and the sharpened diverging edges cut the soil. The strip of soil lifted by the plow 5 slides up the polished, upwardly curving surface thereof and then falls off at both sides thereof. Any surface rubbish is carried to each side of the plow with the soil. The plow 5 acts to shield the forward end of the pair of wing blades, the attachment means for the blades, and the attachment clamp for the plow from the soil and surface rubbish through which the device is traveling. Clogging of the parts enumerated is thus prevented.

The wing blades 15, as they are drawn along slightly below the surface of the soil, cut the stalks or roots of all weeds encountered thereby and, at the same time, mulch the soil.

It is apparent that I have invented a novel, simple, very efficient form of sweep shovel which will not clog when used in soft soil, which effectively clears itself of surface rubbish, which may be quickly and easily attached to or detached from a cultivator shank, which may be used to cut weeds and mulch soil, and wherein the wing blades thereof may easily and quickly be removed for sharpening or replacement.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

What is claimed is:—

1. In a sweep plow, a main plow, an integral pair of rearwardly diverging wing blades, a screw threaded stud and a boss respectively projecting from the lower side of said plow, the forward and connecting portion of said pair of blades being apertured to encircle said stud, and a nut mounted on said stud to retain said pair of blades, said boss engaging the crotch between said blades to retain the same from swinging about said stud.

2. In a sweep plow, a main plow, an integral pair of rearwardly diverging wing blades disposed horizontally, a screw threaded stud projecting from the lower side of said plow, the forward and connecting portion of said pair of blades being extended to lie against the lower side of said plow and being apertured to encircle said stud, a nut mounted on said stud to clamp said extended portion against said plow, and a boss projecting from the lower side of said plow, said boss being shaped and positioned to normally engage the crotch between said blades to prevent swinging of said blades about said stud.

3. In a sweep plow, a main plow, a clamp located at the lower and rear side of said plow for attachment thereof to a cultivator shank, an integral pair of rearwardly diverging wing blades, and screw threaded means for attaching the forward and connecting portion of said pair of blades to the lower side of said plow, said clamp having feet secured to the lower side of said plow, one of said feet being bossed and positioned to permit engagement of said boss in the crotch between the blades of said pair to prevent swinging of said pair of blades about said screw threaded means.

4. A sweep plow consisting of a main plow having a pointed forward end and substantially parallel sides throughout the medial and rear portions and curving upwardly toward the rear, means for attachment to a cultivator shank being secured to the upper and rearward portion of the lower side of said plow, an integral pair of rearwardly diverging wing blades, the outer and forward edge of each of said blades being sharpened, a screw threaded stud projecting downwardly and rearwardly from the medial portion of the lower side of said plow, the forward end of said pair being suitably bent and apertured for mounting on said stud, a nut for securing said pair on said stud, and a boss projecting from the lower side of said plow, said boss being shaped and positioned to be engaged in the crotch between the blades of said pair to cooperate with said nutted stud to hold said pair in symmetrical relation to said plow.

5. In a sweep plow, a main plow, a pair of integrally formed rearwardly diverging wing blades, said blades joining in a forwardly extending attachment portion, a member for securing said attachment portion to the under side of said plow, and a depending retaining element carried by the intermediate portion of said main plow, said retaining element engaging the crotch between said diverging blades to retain the same against swinging about said securing member.

In testimony whereof I affix my signature.

JOHN R. KOVAR.